(12) United States Patent
Rose

(10) Patent No.: US 8,117,528 B2
(45) Date of Patent: Feb. 14, 2012

(54) INFORMATION HANDLING

(75) Inventor: Nicolas Pierre Rose, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 813 days.

(21) Appl. No.: 12/118,138

(22) Filed: May 9, 2008

(65) Prior Publication Data

US 2008/0282184 A1 Nov. 13, 2008

(30) Foreign Application Priority Data

May 11, 2007 (GB) .................................. 0709145.7

(51) Int. Cl.
*G06F 17/00* (2006.01)
*G06F 17/30* (2006.01)
(52) U.S. Cl. ........ 715/200; 715/201; 715/202; 715/203; 715/204; 707/736; 707/737; 707/738; 707/748
(58) Field of Classification Search .......... 715/209, 715/210, 200–204; 707/102, 104.1, 103 R, 707/706, 711, 715, 749, 736–741, 748
See application file for complete search history.

(56) References Cited

U.S. PATENT DOCUMENTS

| | | | |
|---|---|---|---|
| 5,911,139 A * | 6/1999 | Jain et al. ............................... | 1/1 |
| 6,363,380 B1 * | 3/2002 | Dimitrova ..................... | 707/740 |
| 7,644,373 B2 * | 1/2010 | Jing et al. ....................... | 715/838 |
| 2001/0004739 A1 * | 6/2001 | Sekiguchi et al. ............ | 707/100 |
| 2002/0188602 A1 | 12/2002 | Stubler et al. | |
| 2003/0034996 A1 * | 2/2003 | Li et al. .......................... | 345/719 |
| 2003/0069880 A1 * | 4/2003 | Harrison et al. .................. | 707/3 |
| 2003/0123737 A1 * | 7/2003 | Mojsilovic et al. ............ | 382/224 |
| 2003/0187836 A1 * | 10/2003 | Ikeda ................................. | 707/3 |
| 2004/0125124 A1 * | 7/2004 | Kim et al. ..................... | 345/716 |
| 2005/0015712 A1 | 1/2005 | Plastina et al. | |

(Continued)

OTHER PUBLICATIONS

Paolo Ceravolo, et al., "Adding a Peer-to-Peer Trust Layer to Metadata Generators", On the Move to Meaningful Internet Systems 2005: OTM Workshops Lecture Notes in Computer Science, XP 019023059, vol. 3762, Jan. 1, 2005, pp. 809-815.

(Continued)

*Primary Examiner* — Tadeese Hailu
(74) *Attorney, Agent, or Firm* — Oblon, Spivak, McClelland, Maier & Neustadt, L.L.P.

(57) ABSTRACT

An information handling apparatus, in which metadata is generated in respect of a current information item by reference to an ensemble of information items having associated metadata, the metadata having corresponding indicator data representing a degree of trust associated with that metadata, comprises a detector for detecting one or more predetermined properties of the current information item, a detector for detecting a subset of information items from the ensemble of information items, the subset being those which have the one or more predetermined properties most similar to those of the current information item, associating logic arranged to associate with the current information item metadata from one or more of the subset of information items such that the metadata associated with the current information item is allocated indicator data representing a low degree of trust in the association of that metadata and the current information item, and a detector for detecting user interaction with the apparatus which is relevant to an information item and its associated metadata, and for altering the indicator data associated with metadata in response to such user interaction.

18 Claims, 6 Drawing Sheets

U.S. PATENT DOCUMENTS

| | | | |
|---|---|---|---|
| 2005/0238256 A1* | 10/2005 | Bober | 382/305 |
| 2006/0122999 A1* | 6/2006 | Sosnov et al. | 707/5 |
| 2006/0251292 A1* | 11/2006 | Gokturk et al. | 382/103 |
| 2007/0055697 A1* | 3/2007 | Parlin et al. | 707/104.1 |
| 2007/0064626 A1 | 3/2007 | Evans | |
| 2007/0094217 A1 | 4/2007 | Ronnewinkel | |
| 2007/0203942 A1* | 8/2007 | Hua et al. | 707/104.1 |
| 2007/0216773 A1* | 9/2007 | Kojima et al. | 348/207.1 |
| 2007/0239778 A1* | 10/2007 | Gallagher | 707/104.1 |
| 2007/0255755 A1* | 11/2007 | Zhang et al. | 707/104.1 |
| 2008/0144943 A1* | 6/2008 | Gokturk et al. | 382/224 |

OTHER PUBLICATIONS

Paolo Ceravolo, et al., "Bottom-Up Extraction and Trust-Based Refinement of Ontology Metadata", IEEE Transactions on Knowledge and Data Engineering, IEEE Service Center, XP 011152465, vol. 19, No. 2, Feb. 1, 2007, pp. 149-163.

Chinese Office Action issued on Jun. 15, 2011 in corresponding Chinese Application No. 200810128758.8 (English Translation Only).

United Kingdom Office Action issued on Aug. 24, 2011 in corresponding United Kingdom Application No. 0709145.7.

* cited by examiner

INFORMATION HANDLING

BACKGROUND OF THE INVENTION

1. Field of the Invention

This invention relates to information handling.

2. Description of the Prior Art

The problem of identifying and retrieving media content items such as audio and/or video items from asset management systems is a longstanding one. Often digital audio/video files have no associated textual metadata and even the filename may simply be an identification code which is meaningless to a human user.

Systems have been proposed which attempt to allow a user to search a content repository by identifying video and/or audio statistics of an item of interest and search in the repository for similar content items. Such statistics are often called "ground truth" metadata, as they are derived in a repeatable way from video and audio properties of the content. The searching may be performed by defining a feature vector (based on at least a set of significant aspects of the ground truth metadata) for each available content item, and detecting close matches by distance in the vector space. This type of search may return a subset of information from which the user can subjectively determine which are relevant to his requirements. It has been proposed that a user may select relevant hits subjectively, and cross search their feature vectors back into the repository to find further similar content items or hits. This will be termed a "reinforced find similar" search.

Some asset management repositories may include content items having associated textual metadata, while other items in the same repository have no associated metadata. New content items may be ingested with or without associated textual metadata. A search by ground truth metadata can be used to generate a visual representation of available content items to give the user an appreciation of what the types of content stored in the repository. The user may select a number of candidate items from this visualisation and perform a keyword search on those selected to find content items required. Clearly, those items without textual metadata can only be identified as relevant from the visualisation search. It has been proposed that when ingesting new content items into the repository without having associated textual metadata, a feature vector for the new content item could be derived and searched into the asset management system to identify similar content items. For example, the closest match in vector space to the new item could be identified and, if it has associated textual metadata, that metadata could be automatically assigned to the new content item. Thus the new content item can be identified by a textual metadata search without the burdensome requirement for a human to review it and assign, manually metadata to it.

Of course, this has some disadvantages, as often, the metadata assigned to a new content item will not be totally accurate. For example the repository may include a number of shots of racing cars on a track and each car has a metadata defining it as a Formula One racing car (A). There may also be a number of shots of motorcycles parked by the edge of a street with metadata defining the shot as a motorcycle (B). If a new shot is ingested of a superbike race on a racing track (C), then an automated system may determine that (A) is relatively more similar to (C) than (B) due to the presence of a racing track. In such cases, (C) would be incorrectly assigned the metadata "Formula One Racing Car" rather than "motorcycle". The risk of this happening could be reduced by ensuring that metadata is only assigned when a similar item is identified within a threshold distance in the vector space. Alternatively, the system could identify say, the 20 closest items and process their metadata to identify a term frequency for individual words or phrases and assign e.g. the top three words/phrases to the newly ingested content item.

Irrespective, this would be a fairly risky strategy for database administration and could result in many incorrectly labelled items. Further if those incorrectly labelled items were themselves used to automatically populate newly ingested items incorrectly, the result would be a database which was not fit for purpose.

It is an object of the present invention to mitigate or alleviate the above problem.

SUMMARY OF THE INVENTION

This invention provides information handling apparatus in which metadata (e.g. textual metadata) is generated in respect of a current information item by reference to an ensemble of information items having associated metadata, the metadata having corresponding indicator data representing a degree of trust associated with that metadata, comprises a detector for detecting one or more predetermined properties of the current information item, a detector for detecting a subset of information items from the ensemble of information items, the subset being those which have the one or more predetermined properties most similar to those of the current information item, associating logic arranged to associate with the current information item metadata from one or more of the subset of information items such that the metadata associated with the current information item is allocated indicator data representing a low degree of trust in the association of that metadata and the current information item, and a detector for detecting user interaction with the apparatus which is relevant to an information item and its associated metadata, and for altering the indicator data associated with metadata in response to such user interaction.

According to embodiments of the invention, and in recognition of the problems described above, such automatic metadata labelling is performed and, within the database structure, a field is defined by which metadata can be entered (preferably automatically, or potentially manually) which indicates a relative degree of trust in the accuracy of the metadata. This could for example be on a scale of 1 to 10, where 1 indicates unproven accuracy and 10 indicates high confidence in the accuracy. Alternatively it could be a simple two-state trusted or untrusted flag. Such a flag could be changed once a human has verified the accuracy of the metadata.

The invention therefore provides a technique by which the automated assignment of metadata (for example to a newly ingested item) can still be used, but with a reduced danger of a database becoming clogged with potentially inaccurate metadata which is indistinguishable from useful metadata.

Various further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
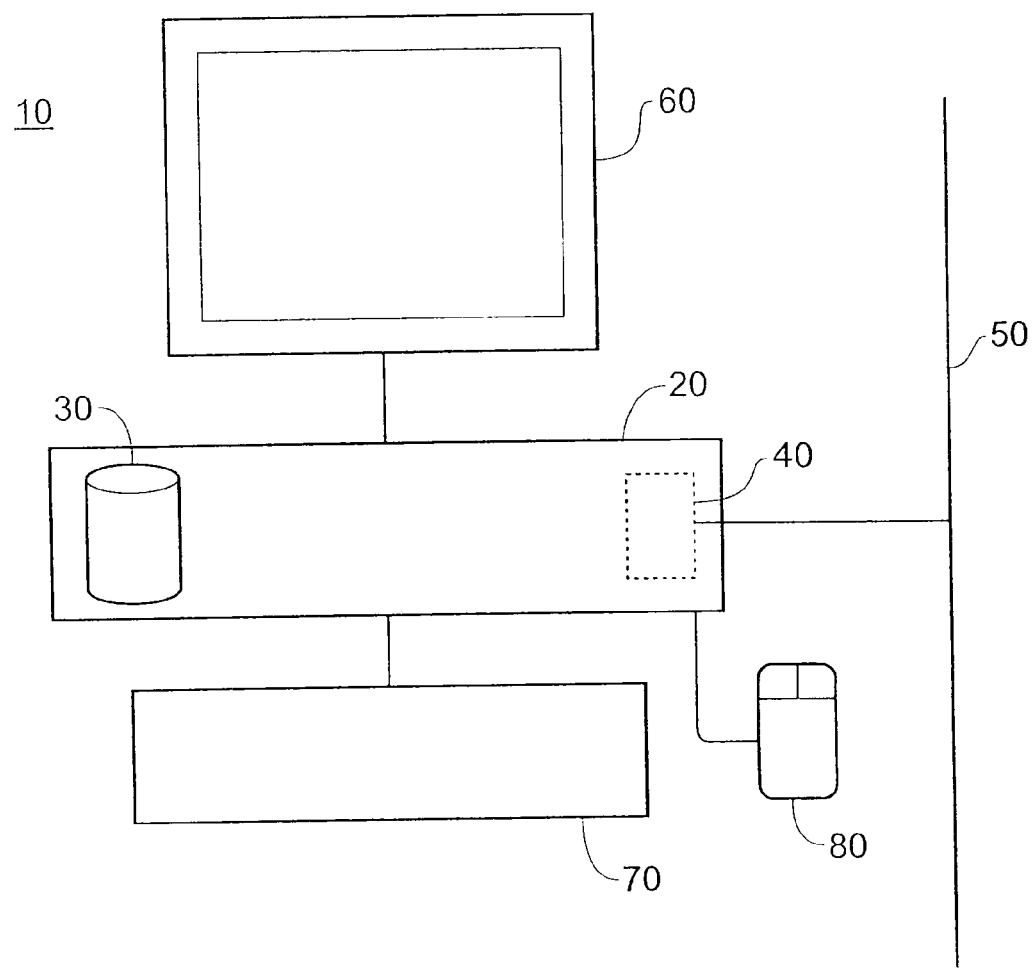
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to audio/video information items, or at least information items having an audio and/or video content or association. For example, a piece of broadcast content such as audio and/or video material may have associated "MetaData" defining that material in textual terms.

The detailed example below refers to an ensemble of audio and/or video data information items and describes the detection of predetermined properties of such information items. Of course, other types of information item could be handled instead (or as well). For example, if the information items were still photographs, image properties of the photographs could be used to form feature vectors. Feature vectors could be formed from information items formed of text (e.g. on the basis of their textual content, number of words, distribution of uncommon words and the like), and so on.

The information items are loaded onto the disk storage 30 in a conventional manner. Preferably, they are stored as part of a database structure which allows for easier retrieval and indexing of the items, but this is not essential. Once the information and items have been so stored, a process is used to apply textual metadata to the items. An example of such a process will be described below.

It will be appreciated that the indexed information data need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, perhaps with an associated summary, abstract or MetaData associated with that link. So, the remotely held information need not be accessed unless the user selected the relevant link (e.g. from the results list 260 to be described below), although for the purposes of the technical description which follows, the remotely held information, or the abstract/summary/MetaData, or the link/URL could be considered as the "information item".

In other words, a formal definition of the "information item" is an item from which a feature vector is derived and processed (see below).

In a further example, the information items could be stored across a networked work group, such as a research team or a legal firm. A hybrid approach might involve some information items stored locally and/or some information items stored across a local area network and/or some information items stored across a wide area network.

It will also be appreciated that the system 10 of FIG. 1 is but one example of possible systems which could use the indexed information items. Another example will be described below with reference to FIG. 6. In general, practically any device having a display could be used for the information-accessing phase of operation.

The processes are not limited to particular numbers of information items.

Figure 2:
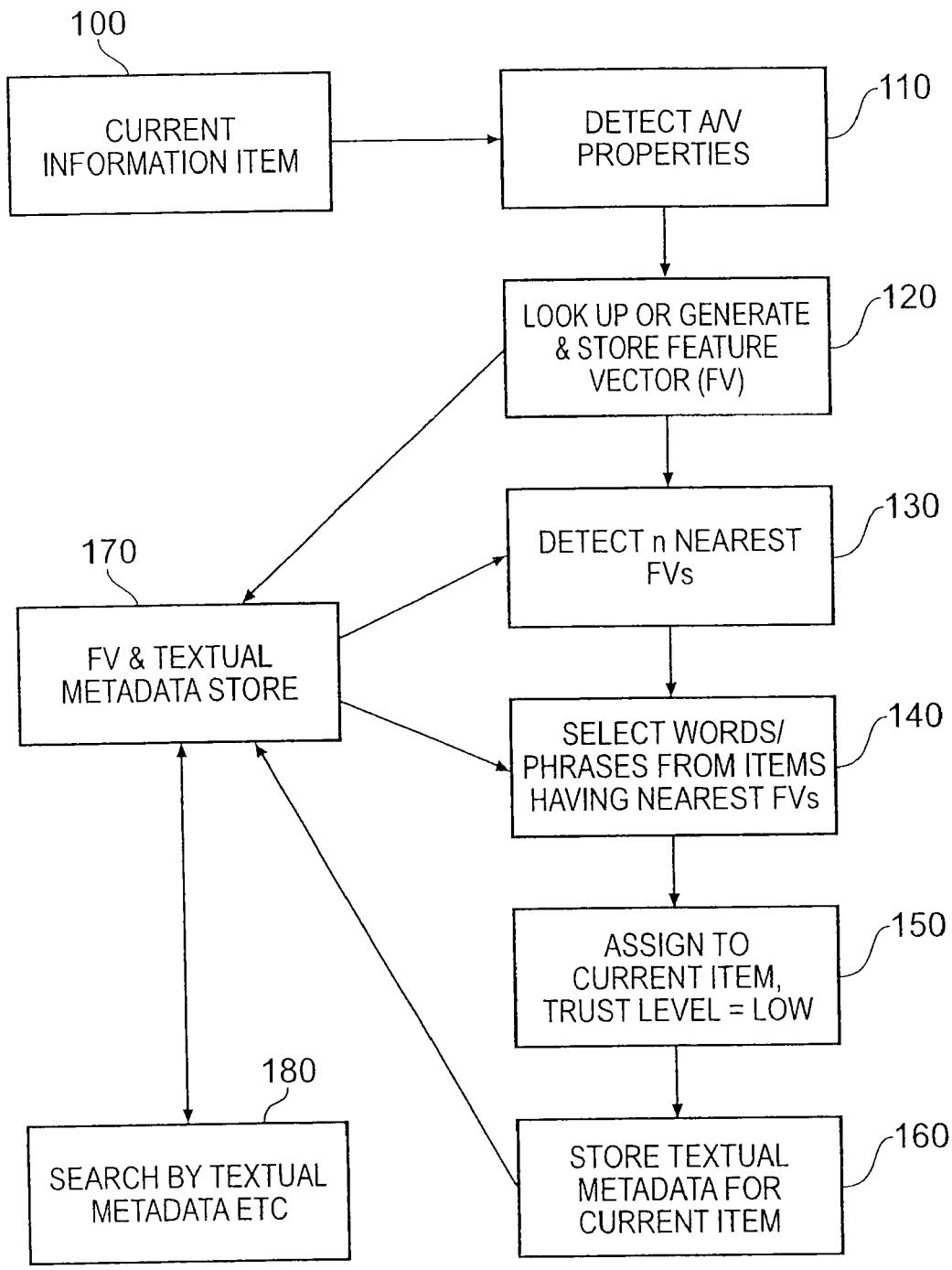
FIG. 2 is a schematic flow chart showing an overall operation of an embodiment of the present invention.

FIG. 2 is a schematic flowchart illustrating the operation of the present embodiment. It will be understood that the operations and storage requirements referred to in FIG. 2 may be carried out with respect to the apparatus described in reference to FIG. 1.

An information item 100 including audio/video material is processed by steps 110, 120, 130, 140, 150 and 160 in order to generate textual metadata (e.g. a title, keywords and/or free text description) to be stored in a feature vector and textual metadata store 170 (which could be a separate store or could be formed by respective database entries associated with each information item). This allows a separate step 180 of searching by text to be carried out.

Here, textual metadata is used as an example of the types of metadata that could be involved. The metadata could instead (or in addition) represent one or more of: an internet or network hyperlink (for example, a link to a similar information item), analytically generated audio and/or video data representing audio and/or video properties of an information item, or other types of metadata.

The textual metadata has associated indicator data representing a degree of trust attached to that metadata. The indicator data, and how it is set and modified, will be described in detail below. For now it is sufficient to note that the indicator data can apply to all of an information item's metadata (i.e. considering that metadata as a group) or separate indicator data can apply to sub-sections of the metadata, e.g. to each phrase or word group. The indicator data has at least two states, though preferably more, indicating various levels of trust in the metadata. At a minimum, the indicator data can indicate a "low" or a "high" level of trust. Of course there are no absolute measures of trust, nor any units by which it is measured. The indicator data is primarily a relative measure of a subjective quantity, but (as will be seen below) is one which can be set and modified by automatic means.

The steps 110 to 160 are particularly relevant to an information item for which textual metadata is being generated for the first time, i.e. no textual metadata is currently held in respect of that information item. However, the technique may also be applied to update or supplement the textual metadata associated with an information item, in which case it is likely that the detection of A/V properties in the step 110 (see below) and the generation of a feature vector in the step 120 (see below) will already have taken place.

Referring to the step 110, audio and/or video (A/V) properties of the information item 100 are detected. At the step 120 a feature vector (in fact, using the terminology below, a "reduced feature vector") is generated and stored in the feature vector and textual metadata store 170. It is important, for the purposes of comparison of feature vectors (see below) that the feature vectors have a manageable length, or number of values, while still providing a useful representation of the information item. There is no absolute quantity for this. In the embodiment described below, a 30 value feature vector is used. Probably 3 values would be too few and 1000 values would require too much processing to compare the feature vectors, but it is for the skilled man to select an appropriate number of values in dependence on the available processing resources.

The steps 110 and 120 will be described in detail below with reference to FIG. 3.

At the step 130, the feature vector for the current information item 100 is compared with stored feature vectors in respect of other information items. The comparison is by the known technique of detecting a Euclidean distance between vectors in a q-dimensional space (where q is the number of values in each feature vector). The n closest (shortest Euclidean distance) feature vectors are selected by this test. For example, n may be 20.

At the step 140 a selection is made from the textual metadata associated with the n closest information items.

At the step 150, words and/or phrases from this selection are applied as metadata in respect of the current information item. In particular, the current information item is automatically populated with a predetermined number of most-frequently-occurring words and/or phrases from this selection, or with words and/or phrases having at least a threshold frequency of occurrence, or a combination of these. The indicator data associated with the automatically populated metadata (for the current information item) is automatically set to a level representing a low degree of trust—preferably the level indicating the lowest degree of trust. The process relevant to the steps 140 and 150 will be described in detail with reference to FIG. 4 below.

Finally, at the step 160, the textual metadata which has been chosen (by the user or automatically) to accompany the current information item is stored in respect of that information item in the feature vector and textual metadata store.

The step 180 schematically illustrates a separate process of searching for information items by textual metadata. It will of course be appreciated that this step may be carried out by the same apparatus at which the steps 110-160 were carried out, or by a different apparatus having access to at least the feature vector and textual metadata store 170. The searching process will be described separately with reference to FIG. 5 below.

Figure 3:
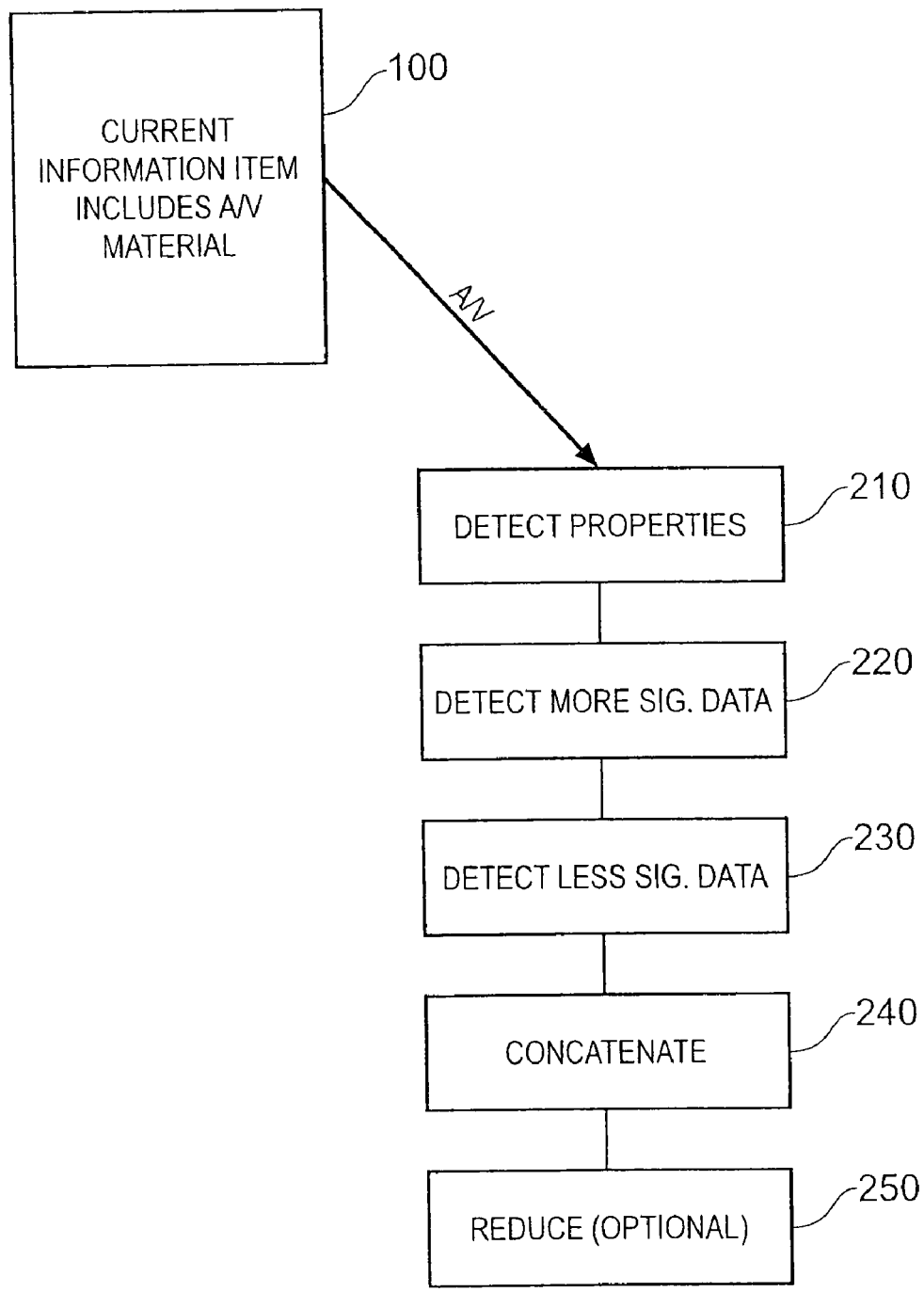
FIG. 3 is a schematic flow chart showing the generation of a reduced feature vector.

FIG. 3 is a schematic flow chart illustrating a so-called "feature extraction" process corresponding to the steps 110 and 120 of FIG. 2. Feature extraction is the process of transforming raw data into an abstract representation. These abstract representations can then be used for processes such as pattern classification, clustering and recognition. In this process, a so-called "feature vector" is generated, which is an abstract representation of various audio and video properties of the item.

The basic steps of FIG. 3 are carried out in respect of information items 100 in a group of information items including audio and/or video material, as follows:

Audio and/or video properties of each information item in turn are detected at a step 210. At steps 220 and 230, a process of detecting the more significant and less significant property data is carried out, leading to the discarding of less significant property data. The remaining (non-discarded) property data is concatenated at a step 240 to generate a "reduced" feature vector. Once the "reduced" feature vectors have been generated for the information item collection, they are available for use in the step 130 of FIG. 2.

An optional further reduction process (e.g. by the known technique of random vector mapping, involving matrix-multiplying a p-valued feature vector by a p×q matrix of random numbers to generate a q-valued feature vector) may optionally be carried out. However, such a further step is not relevant to the present embodiment where a 30-valued feature vector is generated by the process to be described below. Of course, the skilled man will appreciate that random vector mapping could be used in place of the steps 220, 230 and 240 to produce a feature vector of a manageable size.

The steps 220 to 240 could be carried out in another order, so that the data is discarded after concatenation (or indeed the discarding process could occur before and/or after concatenation).

The steps 210 to 240 will now be described in detail.

The aim of the technique is to automatically extract (from audio and video) a feature vector that represents a media item's genre with as few variables as possible (or at least a reduced number of variables); this feature vector is from now on called "reduced feature vector".

The reduced feature vector consists of a combination of several "basic feature vectors". The basic feature vectors encapsulate a specific type of feature like colours, shape etc. The first stage, represented by the step 210, is to detect so-called "basic feature vectors" representing respective properties of the information item.

Creation of the Basic Feature Vectors

There are five types of basic feature vectors that are used in the present embodiment; these are Colour, Shape, Audio, Face and Edge/plain based feature vectors. In fact the reduced feature vector described below does not make reference to the Edge/plain data, but this technique is included to illustrate a further source of possible feature data. It should also be understood that the permutations set out below are simply examples and that other permutations of vectors could be used.

Colour

There are several colour models that could be used. Some examples are described below.

For each colour model, a 20-bin histogram is calculated for each frame in a media item, the average and standard deviation for each column in the histogram is taken over the whole media item. The average and standard deviation vectors are used as basic feature vectors representing a media item. The concatenation of the average and standard deviation is also used as a basic feature vectors and is then called "combination" in the list below. The colour models and feature vectors calculated from them are:

HUE Histogram
    Average
    Standard Deviation
    Combination (concatenated average and Standard Deviation vectors)

Luminance (Brightness) Histogram
    Average
    Standard Deviation
    Combination (concatenated average and Standard Deviation vectors)

Red Histogram
    Average
    Standard Deviation
    Combination (concatenated average and Standard Deviation vectors)

Green Histogram
    Average
    Standard Deviation

Combination (concatenated average and Standard Deviation vectors)
Blue Histogram
Average
Standard Deviation
Combination (concatenated average and Standard Deviation vectors)
RGB Histogram (60 bins, combination of three different histograms)
Average
Standard Deviation
Combination (concatenated average and Standard Deviation vectors)

Shape

Two different types of shape descriptors are described; the difference between them is the step after the Fast Fourier Transform (FFT), step 4. Overall the shape descriptor is extracted in the following way:
1. Each frame is resized to an 64*64 image, for example by bilinear interpolation
2. A fast Fourier transform (FFT) is taken from the resized frame.
3. The first 10 frequency values (lowest frequencies) in each direction are processed (see below) and combined to a 100-value long feature vector.
4. The average and standard deviation for each column in the vector is taken over the whole media item, which gives three feature vectors per post processing method.
    i. Average
    ii. Standard Deviation
    iii. Combination (average and standard deviation feature vector concatenated)

Face

Two different types of face based feature vectors are described; one called "face features" and the other one called "face statistics".

The face statistics basic feature vector is generated as follows:
1. For each frame, calculate the following 3 variables:
    Face count, i.e. how many faces there are within the frame
    Average face size for all the faces within the frame
    Average x (horizontal) position for all the faces in the frame
2. The average and standard deviation are then calculated for all the 3 variables over all the frames within the media item
3. The average and standard deviation for the face-count, size and x-position form a 6 variable feature vector.

The face features basic feature vector is generated as follows:
1. A face classifier that classifies all the faces in a frame into 6 different classes depending on face size and face x-position is used.
    The face classifier works in the following way:
    a. If the size of a face is bigger than 21 pixels (e.g. in width) it is classified as subclass A, and if it is smaller than 21 pixels it is classified as subclass B.
    b. Both subclass A and B are split to three different subclasses, depending on if the face x-position is less than 74 (e.g. pixels from the left), between 74 and 114 or above 114.
2. Each media item has a 7-bin histogram, where the first bin represents frames with no faces; the other bins represent the 6 different face classes. For each frame being analysed each face found increases the bin that its classification belong to by one.
3. The histogram forms a 7-bin basic feature vector that represents a media item.

Audio

Assuming the available audio has a sample rate of 48 kHz; the audio is sampled in 32 ms windows with 16 ms overlap, giving a total of N=1536 samples. The rms amplitude is defined as $$r_j = \sum_{i=1}^{N} (s_i)^2$$

and a frame is defined as silent if $r_j < 0.2 * \bar{r}$ where j is the audio frame and $\bar{r}$ the average rms amplitude over the entire media item.

First, the entire signal is Hamming-windowed with $$W_i = 0.54 - 0.46 * \cos\left(\frac{2\pi i}{N}\right)$$

and thereafter the FFT coefficients $F(\omega)$ are calculated for all the frames. Then the following features are calculated for each audio frame:

Total Spectrum Power. The logarithm of the spectrum power is used:

$$P = \log\left(\int_0^{\omega_0} |F(\omega)|^2 \, d\omega\right) \text{ where } |F(\omega)|^2$$

represents the power at frequency $\omega$ and where, $\omega_0 = 24$ kHz, the half sampling frequency.

Subband Powers. Four subband powers with the following intervals are used $$\left[0, \frac{\omega_0}{8}\right], \left[\frac{\omega_0}{8}, \frac{\omega_0}{4}\right], \left[\frac{\omega_0}{4}, \frac{\omega_0}{2}\right] \text{ and } \left[\frac{\omega_0}{2}, \omega_0\right].$$

The power of the subband is calculated the following way:

$$P_j = \log\left(\int_{L_j}^{H_j} |F(\omega)|^2 \, d\omega\right)$$

where $H_j$ represents the highest frequency and $L_j$ represents the lowest frequency in the interval.

Brightness. Brightness is defined as the frequency centroid, and is calculated the following way.

$$\omega_c = \frac{\int_0^{\omega_0} \omega * |F(\omega)|^2 \, d\omega}{\int_0^{\omega_0} |F(\omega)|^2 \, d\omega}$$

Bandwidth. Bandwidth B is calculated the following way:

$$B = \frac{\int_0^{\omega_0} (\omega - \omega_c)^2 * |F(\omega)|^2 \, d\omega}{\int_0^{\omega_0} |F(\omega)|^2 \, d\omega}$$

Pitch Frequency.

The pitch frequency is determined in the following way:
1. The power spectrum is calculated for each audio frame
2. The power spectrums peaks are emphasised with the discrete operator: {0.25f,0.75f,1.0f,0.75f,0.25f}.
3. The harmonic of the audio window is calculated the following way:
   a. A comb filter that starts with pitch 50 Hz is increased successively until it reaches a pitch of 1000 Hz. For each step the difference between the comb filtered signal "C" and the noise "N" taken.
   i. The comb filter value is calculated in the following way:
      $C_i = 2.25 * S_{i-1} + 1.5 * S_i + 2.25 * S_{i+1}$ where "i" is the pitch frequency and "S" the enhanced signal. Observe that if S=1 for [i−1, i, i+1] then C=6.
   ii. The noise is calculated the following way:

$$N_i = S_{i-\frac{4*i}{6}} + S_{i-\frac{3*i}{6}} + S_{i-\frac{2*i}{6}} + S_{i+\frac{2*i}{6}} + S_{i+\frac{3*i}{6}} + S_{i+\frac{4*i}{6}}$$

Observe that is S=1 for $$\left[i - \frac{4*i}{6}, i - \frac{3*i}{6}, i - \frac{3*i}{6}, i + \frac{2*i}{6}, i + \frac{3*i}{6}, i + \frac{4*i}{6}\right] \text{ then } N = 6.$$

4. This will form a frequency vs. harmonic diagram; the peak of the harmonics gives the pitch frequency.

Mel-Frequency cepstral Coefficients are computed from the FFT power coefficients. A triangular bandpass filter bank filters the coefficients. The filter bank consists of 19-triangular filters with constant mel-frequency intervals covering the frequency range 0-4000 Hz. $S_k\{k=1, 2, \ldots K\}$ denotes the output from the filter bank. The mel-frequency spectrum is calculated the following way:

$$c_n = \sqrt{\frac{2}{K} * \sum_{k=1}^{k} \log(S_k) * \cos\left(n * [k - 0.5] * \frac{\pi}{K}\right)}$$

where n=1, 2, 3 . . . 12 is the order of the cepstrum.

The features described above forms a 20-value feature vector, the average and standard deviation is taken column wise over the whole media, and concatenated to a 40-value feature vector. A 41 variable is added to the feature vector by taking the ratio of silent frames verses total amount of frames for the whole media item.

Edge/Plain Field Feature Vector

Another basic feature vector will now be defined. This is the so called edge/plain field histogram (EPFH) feature vector. It is generated by two basic steps:
1. The quantisation of the colour values in the image.
2. Creation of EPFH The Quantisation of the Colour Space The process starts from a HSV (Hue Saturation Value) coded image, where $0 \leq H \leq 360$, $0 \leq S \leq 1$, $0 \leq V \leq 1$. If the image under consideration is not provided in this format, it is a straightforward (and known) mapping operation to convert it to this format.

If the HSV colour space were visualised, it would be in the form of a cone. The quantification step aims to divide the cone into different blocks. Each block is indexed with a number; the number itself is irrelevant the only function of the number is to work as an index.

The index is the value generated (or "returned") by the saturation quantisation set out first. This in turn refers to hue and luminance quantisation set out below.

The Saturation is Quantised into 4 Parts:

| | | |
|---|---|---|
| 0.00 < Saturation ≤ 0.03 | →Achromatic | return LuminanceA |
| 0.03 < Saturation ≤ 0.33 | →Low Chromatic | return 7 * LuminanceC + Hue − 1 |
| 0.33 < Saturation ≤ 0.66 | →Medium Chromatic | return (3 + LuminanceC) * 7 + Hue − 1 |
| 0.66 < Saturation ≤ 1 | →High Chromatic | return (6 + LuminanceC) * 7 + Hue − 1 |

In the case of the last three categories, the hue and luminance are quantised as follows:

The Hue is Quantised into 7 Non-Uniform Parts:

| | | |
|---|---|---|
| 330 < hue ≤ 22 | return 1 | //red |
| 22 < hue ≤ 45 | return 2 | //orange |
| 45 < hue ≤ 70 | return 3 | //yellow |
| 70 < hue ≤ 155 | return 4 | //green |
| 155 < hue ≤ 186 | return 5 | //cyan |
| 186 < hue ≤ 278 | return 6 | //blue |
| 278 < hue ≤ 330 | return 7 | //purple |

The LuminanceC (Value) is Quantised in 3 Parts:

| | | |
|---|---|---|
| 0.00 < Saturation ≤ 0.33 | →Low Luminance | return 0 |
| 0.33 < Saturation ≤ 0.66 | →Medium Luminance | return 1 |
| 0.66 < Saturation ≤ 1 | →High Luminance | return 2 |

In the case of a classification as "achromatic", the luminance value is quantised:

The LuminanceA (Value) is Quantised in 4 Parts in an Achromatic Region:

| | | |
|---|---|---|
| 0.00 < Luminance ≤ 0.25 | →White | return 63 |
| 0.25 < Luminance ≤ 0.50 | →Light Grey | return 64 |
| 0.50 < Luminance ≤ 0.75 | →Bark Grey | return 65 |
| 0.75 < Luminance ≤ 1 | →Black | return 66 |

The Creation of EPFH

Next, iterating through the pixels in an image, each pixel (centre pixel) is compared with its surrounding pixels (that is a group of 8 pixels). If any one of the surrounding pixels has a different colour index value than the current centre pixel then the centre pixel is considered a "edge" pixel; otherwise it is considered a plain field pixel.

To avoid confusion, the term "centre" refers to the pixel's spatial (image) position with relation to the pixels with whose colour properties it is being compared. The terms "edge" and "plain field" refer to the current centre pixel's position in colour space with reference to the spatially surrounding pixels.

If a pixel is classified as an edge pixel it is added to an "edge" histogram; otherwise it is added to a "plain field" histogram.

The bins in each of the histograms are the colour indices described above.

Post Processing of the Feature Vectors

The edge histogram and the plain field histogram are both individually normalised so their length equals 1. The ratio of edge pixels to total pixels in the image is also calculated (the "edge ratio").

The final feature vector comprise a concatenation of the normalised edge histogram, the normalised plain field histogram and the edge ratio.

Creation of Reduced Feature Vector Subparts

Colour

The basic colour feature vector consists of the average and standard deviation of a 60 bin RGB histogram (20 bin per colour) over the whole media item. This gives a feature vector consisting of 120 variables.

The colour histogram is transformed with the Hotelling transform and truncated so that the 7 first variables are kept.

The Hotelling Transform is based on statistical properties of the feature vectors. A transformation of a 20 variable vector will result in a 20 variable vector with the top/first variables being the one with most variance (i.e. they could be considered to be the more significant variables). This means that the transform moves the most important features in the feature vector to the beginning of the vector.

Shape

Each frame is resized from its starting size (e.g. 720*576 pixels) to 64*64 with bilinear interpolation. The 64*64 image is transformed by an FFT process and the logs of the power of the 10 lowest frequencies plus one are saved:

$$D(u,v)=10*\log(1+|F(u,v)|)$$

This forms a 100-value long vector. These vectors are produced for each frame, and the average and standard deviation over the whole media item is used as a feature vector. This means that we have a 200-value long feature vector.

The shape feature vector is transformed with the Hotelling transform and truncated so that the 10 first variables are kept.

Audio

The audio feature is created as described above and that creates a 41-value feature vector. The 7 most significant values (as detected by the Hotelling transform) are retained.

Face

The face feature vector is created as described above and that creates a 6-value feature vector.

Concatenation and Normalisation

The sub-feature vectors are normalised with mean standard deviation normalisation and concatenated to form a 30-value feature vector.

Figure 4:
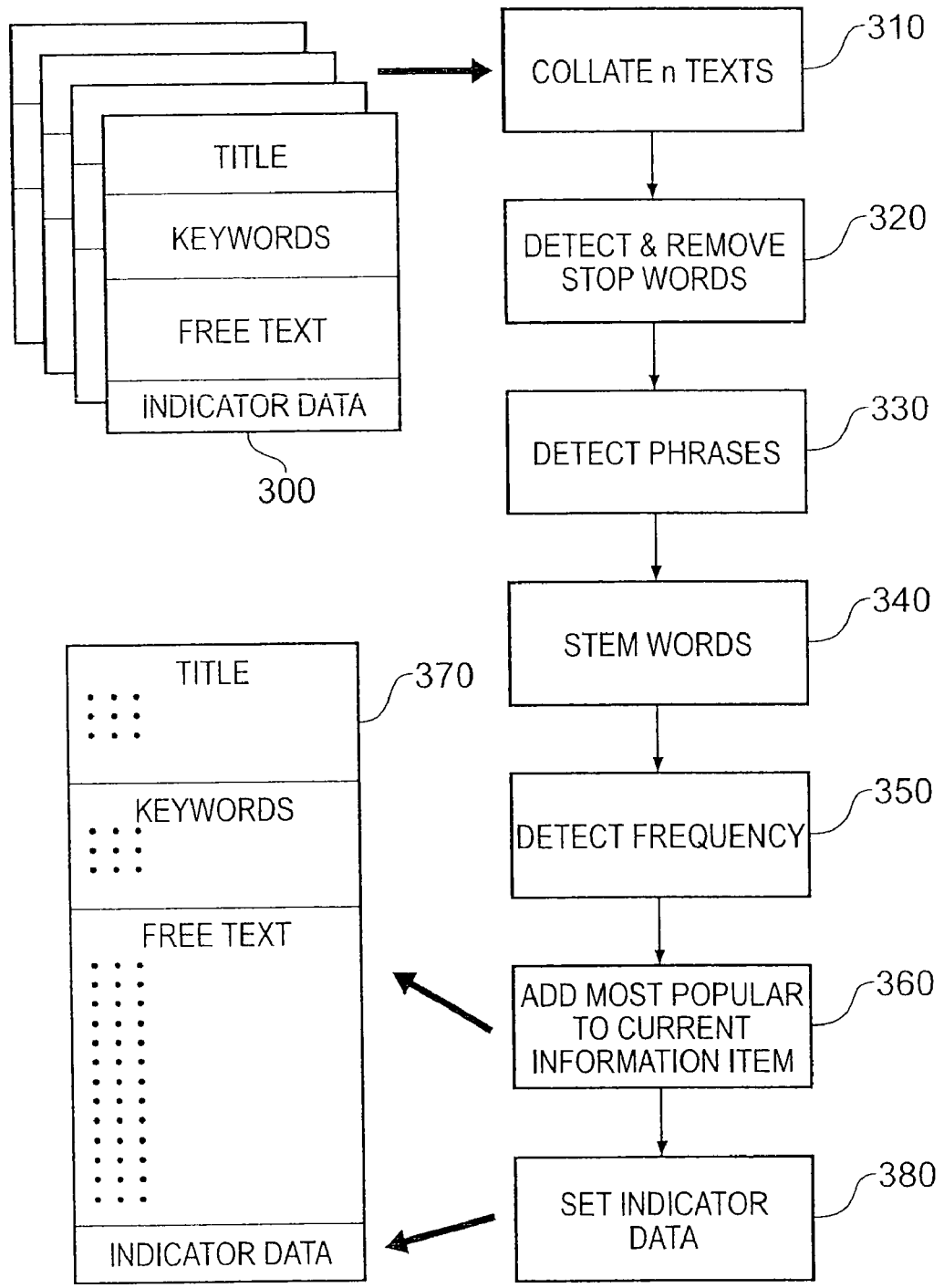
FIG. 4 is a schematic flow chart showing the generation of automatically inserted metadata.

FIG. 4 schematically illustrates a process corresponding to the steps 140 and 150 of FIG. 2. It is assumed that the n closest information items (in terms of their feature vectors) have been identified at the step 130, and that textual metadata 300 in respect of at least some of those information items is stored in the feature vector and textual metadata store 170.

In the present example, the textual metadata 300 is arranged as a title, some keywords, some free text description of the information item and indicator data (corresponding to the whole of the metadata or to respective parts of it). It will of course be appreciated that this exact arrangement of the textual metadata is not essential and indeed that the textual metadata need not be partitioned at all, apart from some denomination of the indicator data within the textual metadata.

At a step 310 the textual metadata corresponding to the n nearest information items (or at least those which have some textual metadata) is collated into a single set for a sorting process. In the description which follows, this collated set of textual metadata will be considered as a document, but this is just for ease of description and understanding.

At a step 320, all "stop words" are removed from the document. Stop-words are extremely common words on a pre-prepared list, such as "a", "the", "however", "about", "and", and "the". These words are sufficiently common that they are not likely to be useful as information item-specific suggestions to the user or as automatically generated textual metadata.

The detection of stop words serves another purpose, which is to delimit "phrases" at a step 330. In other words, a phrase is considered to be those words (or the first predetermined number, e.g. 3, of such words in the case of longer phrases) between two stop words. In the present system phrases are treated as words for the assessment of frequency of occurrence and the suggestion of candidate items for inclusion in the textual metadata.

After removing stop-words and detection of phrases, the remaining words are "stemmed" at a step 340, which involves finding the common stem of a word's variants. For example the words "thrower", "throws", and "throwing" have the common stem of "throw".

At a step 350, the words and phrases are sorted by frequency of occurrence, and the most frequently occurring words or phrases are identified. Where such a word had been stemmed, the most frequently occurring version of that word prior to the stemming process is used as the version to be presented to the user.

At a step 360 a number of the most frequently occurring such words and phrases are added to a set 370 of words and phrases to be stored in respect of the current information item.

The example set 370 shown in FIG. 4 has different sub-lists in respect of the title, keyword and free text metadata fields. The analysis of the steps 310-360 could be carried out separately for these three fields in the data 300. Or the lists could be based on the same selection, but perhaps with fewer entries in the title and keyword lists. Or as an alternative, a single candidate list could be provided.

At a step 380, the indicator data associated with the set 370 is initialised. In one embodiment, this is initialised to a value representing the lowest degree of trust within the available range of values. In another embodiment, a sub-range of values (i.e. the value representing the lowest degree of trust and one or more other values indicating next lowest degrees of trust) are available. Here the selection of the value to be initialised for the set 370 depends on the degree of trust associated with the source metadata. That is to say, if the metadata in the set 370 (or an item of that metadata) was previously associated with indicator data representing a high degree of trust (i.e. in the instance where that metadata was associated with an information item found to have a feature vector near to that of the current information item) then the indicator data for that metadata in respect of the current information item could be initialised to a level of trust a little higher than the lowest possible level.

In its simplest form, therefore, the indicator data is associated with the whole of the metadata corresponding to an information item (or even to a sub-group of information items). For example:

| Metadata for information item n | Indicator data: Trust = 3/10 |
|---|---|

In a more advanced form, the indicator data could be associated with subsets of the metadata for a single information item. For example:

| Motorbike | Trust = 4/10 |
|---|---|
| Race track | Trust = 7/10 |
| Blue | Trust = 1/10 |
| Sunny | Trust = 9/10 |

As described above, the indicator data is preferably initialised to a low value when the corresponding metadata is copied across from one or more nearest information items at the steps 150 or 360/370. The reason is that even if that metadata accurately describes the "nearest" information items, it may be quite inaccurate as a description of the current information item, since the only thing that the nearest and current information items have in common is an analytical measure of their audio and video properties.

A mechanism is therefore provided for the user to upgrade the level of trust in the metadata, if it proves that the metadata is accurate. A similar mechanism can be provided for the user to downgrade the level of trust, or even to delete the metadata, should the metadata be grossly inaccurate.

Figure 5:
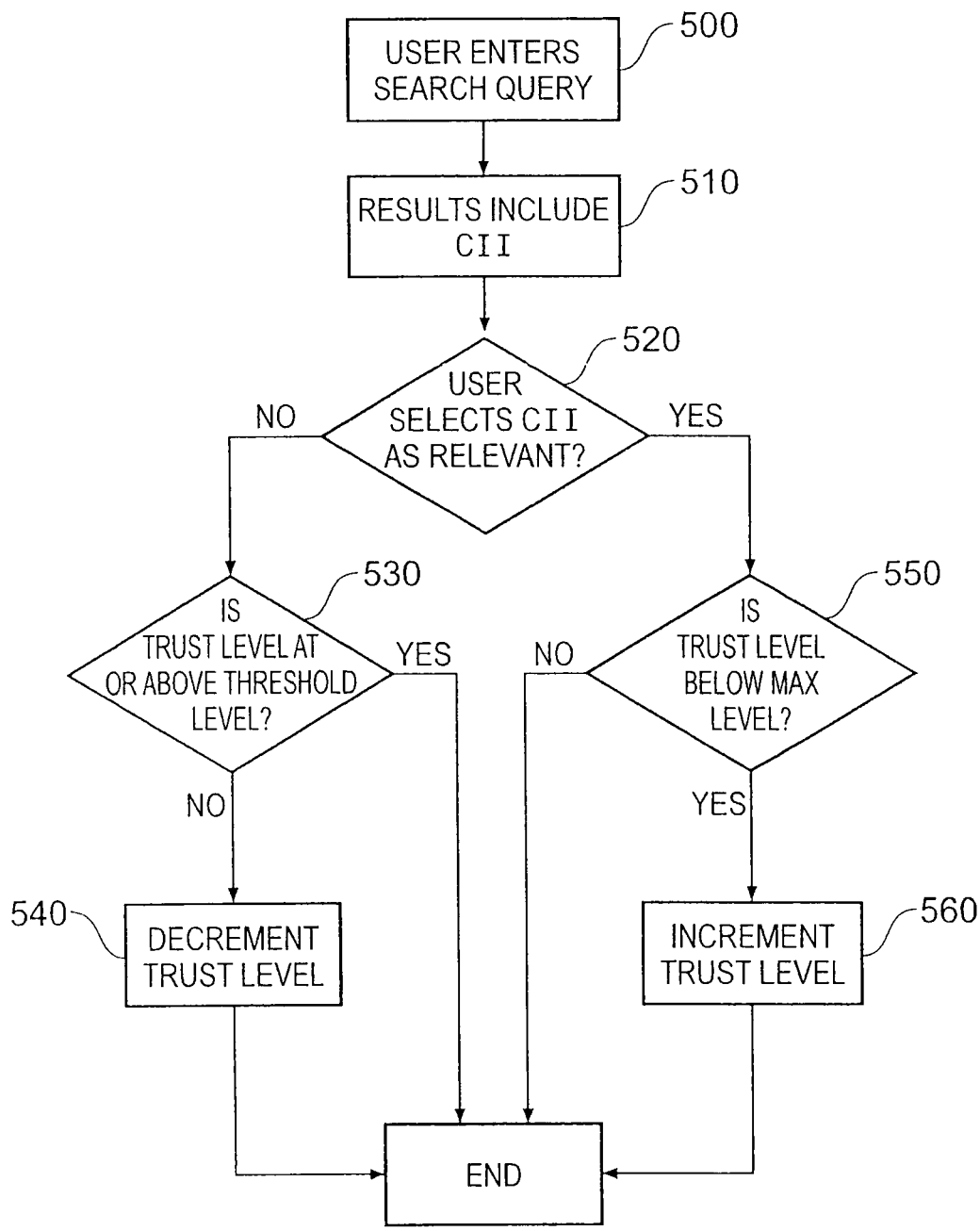
FIG. 5 is a schematic flow chart illustrating the automatic modification of trust levels associated with metadata.

FIG. 5 schematically illustrates one example of a mechanism for handling variations in trust level. This example relates to a so-called reinforced search. An example of this is the reinforced find similar search mentioned above.

At a step 500 the user enters a search query to search amongst the ensemble of information items. This could take the form of a textual query which is compared with textual metadata associated with the information items, or it could be a feature vector query initiated by the user requesting (from the system) a set of information items which are similar to a user-selected information item. A set of results is returned at a step 510.

The user then reviews those results. The user can select a result as relevant to the query, for example by clicking (using a user control such as the mouse 80) on a screen icon representing that result. This could be a further (or an initial) selection for a "find similar" search. In other words, the user might be interacting with the system for another purpose, and such interaction is detected and used in the process which follows.

In respect of a current information item (CII) (not the current information item referred to in respect of FIG. 2, but a current one in terms of the process of FIG. 5), if the user selects it as relevant at a step 520, control passes to a step 550. If the user does not select it as relevant (or positively selects it as not being relevant) then control passes to a step 530.

Referring to the steps 530 and 550, modifications may be made to trust levels associated with the CII. Such modifications could relate to a single trust level associated with the whole of the metadata associated with the CII. Or, if there are plural trust levels each associated with an aspect or subset of the CII's metadata, the modification preferably applies only to the one or more trust levels associated with metadata which (a) is the same as or very similar to metadata of the information item which started the find similar search, or (b) is the same as or very similar to the textual search query which prompted the current search.

At the step 530, a test is applied to see if the trust level is at or above a threshold level (e.g. 8/10). If it is, then no action is taken. If not, then the trust level is decremented and the process (as regards the modification of the trust level in this instance) ends.

Note that terms like "decrement" and "increment" are used for convenience of explanation, in the context of an arrangement in which lower numbers represent lower trust levels. The skilled person will appreciate that the exact convention (i.e. what lower and higher numbers signify) is unimportant, and that more generally, to decrement means "to move towards a value or data code representing a lower trust level", and vice versa for "increment".

If the result of the step 540 is that the trust level is now zero, or if the trust level before the step 540 was already at its lowest possible value, then an optional step can be carried out in which the respective metadata is automatically deleted.

Turning now to the step 550, a test is carried out to detect whether the trust level is below its maximum allowable level. If the answer is yes, then at a step 560 the trust level is incremented. If the answer is no, then the process ends.

In summary of FIG. 5, therefore, the system detects user input (e.g. the selection of an item as relevant to a search query) which is relevant to the trust level of metadata (or a subset of metadata) which is associated with an information item. In response to such a detection, the system automatically modifies the trust level associated with that metadata.

There are accordingly various possibilities, some of which have already been described and some which will now be described in respect of an example trust scale of 1 to 10. These possibilities can be combined or treated individually.

1) If the information item repository permits reinforced find similar searching (of the type described above) or the like, then each time the item is selected in conjunction with an item having verified metadata or metadata having at least a threshold trust level, the trust level could be increased by 1
2) The trust level could be decremented if a user indicated that two items were dissimilar
3) When the trusted flag reaches a high trust level (e.g. level 8 or above), it could be prevented from falling below that level
4) Level 10 could be reserved as an indicator of verified status, so for example a database administrator or other user could regularly perform a search to identify those cases reaching 9, and manually check if the metadata is accurate, and if it is, then to assign verified status to those items.
5) Information items with a trust level below a predetermined threshold would not be used for populating the metadata fields of newly ingested items
6) Manually entered (e.g. hand typed) metadata could automatically be assigned a predetermined trust level—say a level of 7.
7) Trust level could be a search criterion, or one of several search criteria, so that (for example) only those information items having metadata of at least a certain trust level which matches the search query would be returned as search results.

Such a system could be employed in peer to peer networks if content items or in a shared community style database of video clips (for example one in which a user can upload content items and is free to add or change metadata associated with content items), as well as in a commercial asset management database. The metadata could be used in a content recommendation system, in which a user can choose whether to receive recommendations based on trusted or untrusted metadata to assist in the discovery of new content of which he had previously been unaware. There could be some incentives (financial or otherwise) to verify the metadata. Traceability of changes implemented would be needed for security for peer reviewed metadata.

Figure 6:
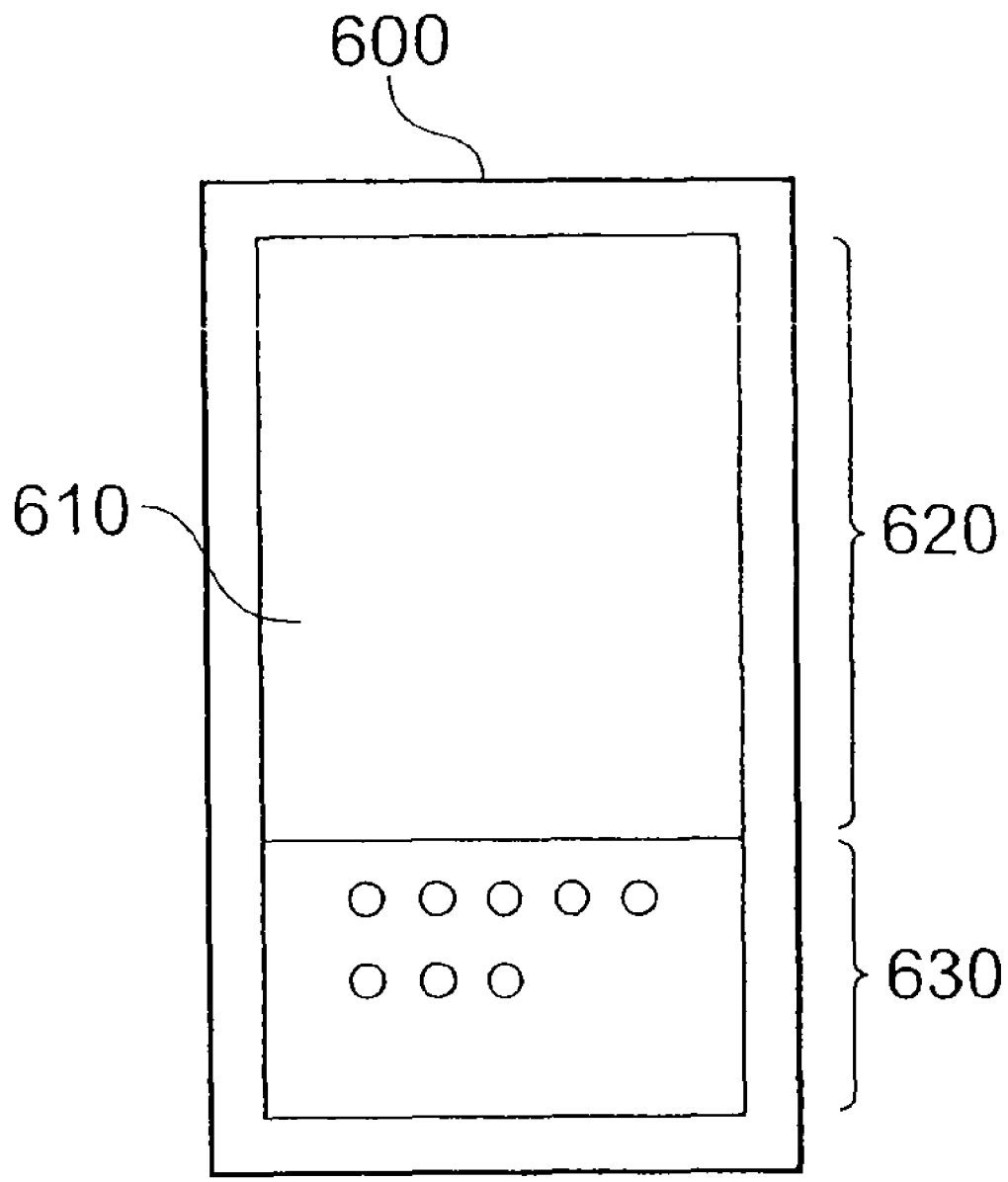
FIG. 6 schematically illustrates a personal digital assistant (PDA).

Finally, FIG. 6 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in place of or in association with the system of FIG. 1, possibly accessing information items and/or metadata stored on the system of FIG. 1, for example via a wireless link (not shown).

It will be appreciated that embodiments of the invention may be implemented by adaptation to existing parts of a conventional equivalent device, which may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Similarly, it will be appreciated that an apparatus as shown generically in FIG. 1, when operating in accordance with the above description, provides processing logic, storage and the like to implement embodiments of the invention.

It will also be appreciated that information items may be stored or transmitted along with their associated metadata and indicator data indicating a degree of trust associated with the metadata. The information items may be collated with the metadata and indicator data to form a database operable for searching as shown in FIG. 5.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

General Notes on the Hotelling Transform

The Hotelling transform is also known as Principal component, eigenvector and discrete Karhunen-Loéve transform. The Hotelling transform is a very useful way to reduce the redundancy within feature vectors.

Consider a population of vectors.

$$X = \begin{bmatrix} x_1 \\ x_2 \\ x_3 \\ x_4 \end{bmatrix}$$

With a mean vector $$m_x = E(x)$$

And a covariance matrix $$C_x = E((x-m_x)(x-m_x)^T)$$

If one takes the eigenvalues and the matching eigenvectors and order the eigenvectors in a order matching the decreasing values of the eigenvalues one get matrix A.

$$A = \text{eig}(C_x)$$

The Hotelling transform is then described with the following formula:

$$y = A \cdot (x - m_x)$$

Where x is transformed to y. The first dimension in the y vector has the highest variance; the second dimension has the second highest variance, etc. This is due to the fact that we organise the eigenvector with respect to the size of the eigenvalues.

General Notes on Vector Normalisation

Vector normalisation is a standard algebraic procedure, where one divides the vector by its own norm. This results in a vector of length 1.

$$v_{normalized} = \frac{v}{\|v\|}$$

$$\|v_{normalized}\| = 1$$

General Notes on Column Linear Transformation Normalisation

For each column one finds the min and max and transforms it to a new min and max.

$$x_{new} = x_{old} \cdot a + m$$

$$a = \frac{x_{new}^{max} - x_{new}^{min}}{x_{old}^{max} - x_{old}^{min}}$$

$$m = x_{new}^{max} - x_{old}^{max} \cdot a$$

General Notes on Mean and Standard Deviation Normalisation

Mean and Standard deviation normalisation is a type of column normalisation. The mean and standard deviation is taken column wise. Each value is then translated by the mean and divided by the standards deviation for that column.

$$x_{new} = \frac{(x_{old} - \text{mean})}{stdDev}$$

I claim:

1. An information handling apparatus comprising:
    a memory that stores computer executable instructions;
    a processor that executes the computer executable instructions;
    a property detector that detects, in conjunction with the processor, one or more predetermined properties of a current information item;
    a subset detector that detects, in conjunction with the processor, a subset of information items from an ensemble of information items, said subset being those which have said one or more predetermined properties most similar to those of said current information item, wherein
    the subset of information items have metadata associated therewith, and
    the processor associates at least some of said metadata of the subset of information items with said current information item, and allocates said at least some of said metadata of the subset of information items associated with said current information item indicator data representing a low degree of trust in the association of said at least some metadata and said current information item; and
    an interaction detector that detects, in conjunction with the processor, user interaction with said apparatus which is relevant to the current information item and the metadata associated with the current information item, and that alters said indicator data of said metadata associated with the current information item in response to said user interaction.

2. The apparatus according to claim 1, wherein said metadata comprises textual metadata.

3. The apparatus according to claim 1, in which said metadata comprises data representing an internet or network hyperlink.

4. The apparatus according to claim 1, in which said information items comprise at least one of audio and video data, and said property detector is operable to detect one or more properties of said at least one of audio and video data.

5. The apparatus according to claim 4, in which said one or more predetermined properties include one or more properties selected from the list comprising:
    hue statistical distribution;
    luminance statistical distribution;
    brightness statistical distribution;
    colour component statistical distribution;
    image shape;
    face detection statistics;
    audio power;
    audio sub-band powers;
    audio brightness;
    audio bandwidth;
    audio pitch; and
    audio mel-frequency properties.

6. The apparatus according to claim 4, further comprising:
    a feature vector generator that generates a feature vector comprising feature data values indicative of said one or more predetermined properties, wherein
    said subset detector is operable to detect those information items having a feature vector having a shortest Euclidean distance from said feature vector of said current information item.

7. The apparatus according to claim 6, wherein the processor discards feature data relating to less significant properties of said information items.

8. The apparatus according to claim 6, further comprising a storage device that stores the feature vector in respect of at least some of said ensemble of information items.

9. The apparatus according to claim 4, in which said metadata is indicative of at least one of audio and video properties of said information item.

10. The apparatus according to claim 1, in which said processor allocates indicator data representing a lowest degree of trust to the metadata associated with the current information item.

11. The apparatus according to claim 1, in which said processor allocates indicator data to the metadata associated with the current information item representing a degree of trust dependent on said degree of trust of that metadata when associated with an information item in said subset.

12. The apparatus according to claim 1, in which said interaction detector is operable to detect a user input that the current information item is or is not relevant to a search query.

13. The apparatus according to claim 1, in which said interaction detector is arranged not to reduce said level of trust represented by said indicator data if said indicator data represents at least a threshold level of trust.

14. The apparatus according to claim 1, further comprising:
    an approval detector that detects whether said user has specifically approved the metadata associated with the current information item and, if so, sets said indicator data associated with the metadata to represent a predetermined level of trust.

15. The apparatus according to claim 1, wherein said processor searches within said ensemble of information items, said indicator data being a search criterion.

16. The apparatus according to claim 1, in which said interaction detector is arranged to delete metadata having indicator data which has been altered to represent a lowest possible trust level.

17. An information handling method comprising:
    detecting, with an information handling apparatus, one or more predetermined properties of a current information item;
    detecting, with the information handling apparatus, a subset of information items from an ensemble of information items, said subset being those which have said one or more predetermined properties most similar to those of said current information item, wherein the subset of information items have metadata associated therewith;
    associating, with the information handling apparatus, at least some of said metadata of the subset of information items with said current information item;
    allocating, with the information handling apparatus, said at least some of said metadata of the subset of information items associated with said current information item indicator data representing a low degree of trust in the association of said metadata and said current information item; and
    detecting, with the information handling apparatus, user interaction which is relevant to an information item and its associated metadata, and for altering said indicator data associated with metadata in response to such user interaction.

18. A non-transitory computer readable storage medium encoded with instructions, which when executed by a computer causes the computer to execute a method comprising:
    detecting one or more predetermined properties of a current information item;
    detecting a subset of information items from an ensemble of information items, said subset being those which have said one or more predetermined properties most similar to those of said current information item, wherein the subset of information items have metadata associated therewith;

associating at least some of said metadata of the subset of information items with said current information item;

allocating said at least some of said metadata of the subset of information items associated with said current information item indicator data representing a low degree of trust in the association of said metadata and said current information item; and detecting user interaction which is relevant to an information item and its associated metadata, and for altering said indicator data associated with metadata in response to such user interaction.

* * * * *